(No Model.)
D. S. NEIMAN.
OIL FILTER.
No. 305,953.   Patented Sept. 30, 1884.
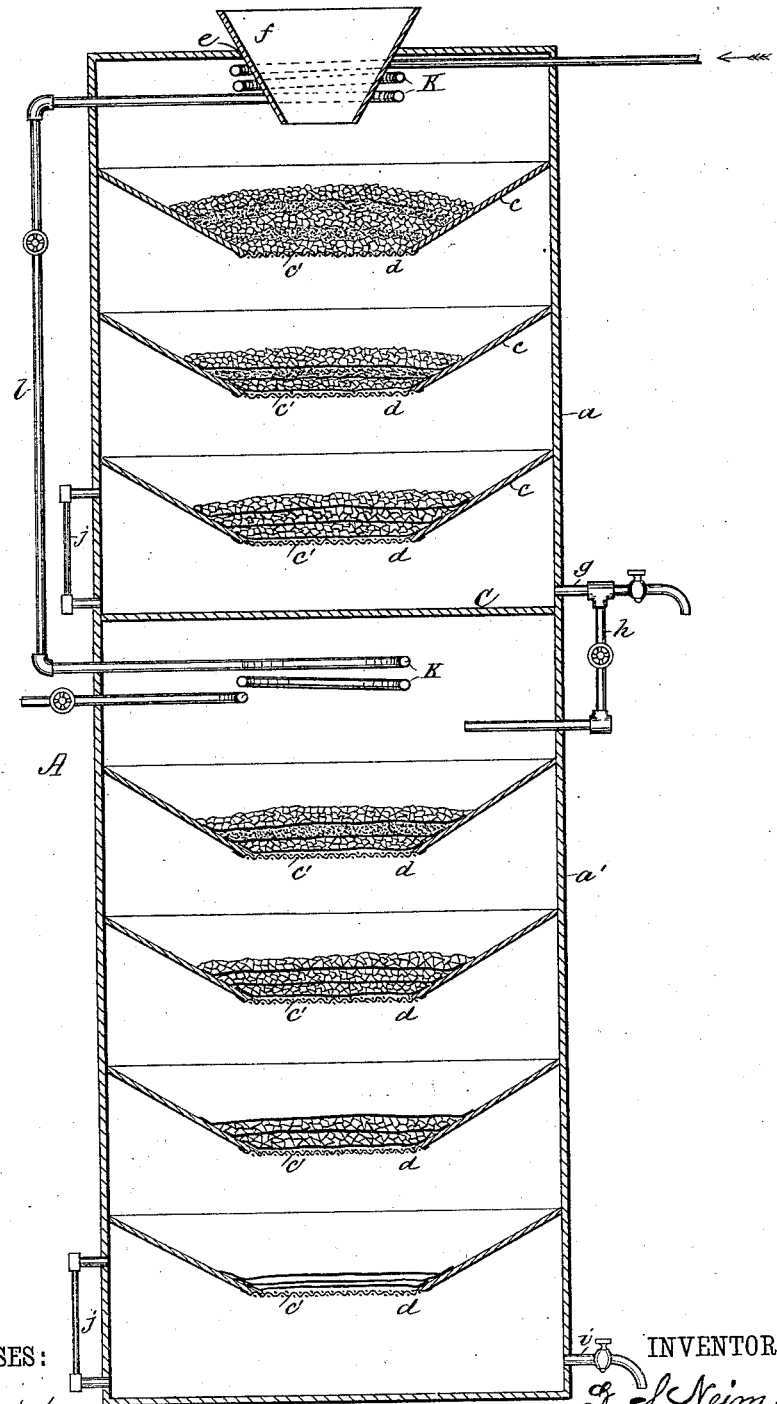
WITNESSES:
W. W. Hollingsworth
A. G. Lyne
INVENTOR:
D. S. Neiman
BY Munn & Co
ATTORNEYS.

UNITED STATES PATENT OFFICE.

DANIEL STARE NEIMAN, OF FARGO, DAKOTA TERRITORY.

OIL-FILTER.

SPECIFICATION forming part of Letters Patent No. 305,953, dated September 30, 1884.

Application filed October 20, 1883. (No model.)

*To all whom it may concern:*

Be it known that I, DANIEL S. NEIMAN, of Fargo, in the county of Cass and Territory of Dakota, have invented a new and useful Improvement in Oil-Filters for Purifying Waste Machine-Oil, of which the following is a full, clear, and exact description, reference being had to the annexed drawings, forming part of this specification.

The object of my invention is to provide a filter by which the waste or drippings of lubricating-oil in machinery, when collected, may be purified and prepared for reuse as a lubricating-oil; and the invention consists of the novel construction hereinafter described and claimed.

The drawing is a vertical section of the filter.

A indicates a cylindrical tank or vessel, formed with two compartments, $a a'$, by means of a horizontal partition or diaphragm, C. The upper compartment, $a$, is provided with three annular shelves, $c$, arranged one above another, and the lower compartment, $a'$, with four such shelves, each shelf being formed with a central circular depression or incline leading to the opening $d$, each series of which openings forms a continuous passage through its proper compartment. The tank is closed at the top, and is provided with a central opening, $e$, located above the openings $d$, in which opening $e$ is arranged a funnel, $f$, through which the oil is to be fed into the filter. The compartment $a$ is provided at its bottom with a discharge-pipe, $g$, which has a branch, $h$, leading into the upper part of the lower compartment, $a'$, and the latter has a discharge-pipe, $i$. Each compartment has a glass tube, $j$, located on its outside and communicating with its interior, as an indicator of the purity of the filtered oil.

To facilitate the flow of the oil, each compartment is provided with a coil, K, of steam-pipe, located in its upper end and having proper connections for supplying steam thereto. These two coils are connected together by a pipe, $l$, which is arranged on the outside of the filter. The pipes are to be supplied with cocks for regulating the flow of the oil and steam. The tank thus constructed is to be provided with layers of charcoal, lime, and woolen cloth, which are supported on the shelves and on wire screens $c'$, arranged in the openings $d$. The relative arrangement of the layers varies in different shelves, the masses of angular lines indicating charcoal, the masses of dots indicating lime, and the solid waving lines indicating cloth.

What I claim is—

The tank having a funnel at its upper end and a series of shelves provided with layers of charcoal, lime, and woolen cloth, arranged in the relative order specified, in combination with the steam-coil surrounding the lower end of the funnel, substantially as shown and described.

DANIEL STARE NEIMAN.

Witnesses:
T. C. PAXTON,
JAS. E. CASSIDY,
R. KEYWORTH.